United States Patent
Harms et al.

(10) Patent No.: US 8,571,219 B2
(45) Date of Patent: *Oct. 29, 2013

(54) AUTHENTICATION LOADING CONTROL AND INFORMATION RECAPTURE IN A UMTS NETWORK

(75) Inventors: David C Harms, West Chicago, IL (US); Robert M Zieman, Naperville, IL (US)

(73) Assignee: Alcatel Lucent, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/421,301

(22) Filed: Mar. 15, 2012

(65) Prior Publication Data

US 2012/0172003 A1    Jul. 5, 2012

Related U.S. Application Data

(63) Continuation of application No. 11/820,341, filed on Jun. 19, 2007, now Pat. No. 8,175,270.

(51) Int. Cl.
*H04K 1/00*    (2006.01)

(52) U.S. Cl.
USPC ............... 380/247; 380/30; 380/46; 380/279; 713/155; 726/5; 370/241; 370/254; 370/522

(58) Field of Classification Search
USPC .............. 380/247, 30, 46, 279; 455/410, 411; 709/223–224; 235/380; 713/155; 726/5; 370/241, 254, 522
See application file for complete search history.

(56) References Cited

U.S. PATENT DOCUMENTS

| 7,359,512 B1 * | 4/2008 | Elliott ........................... 380/253 |
| 2006/0128362 A1 * | 6/2006 | Bae et al. ........................ 455/411 |
| 2007/0158414 A1 * | 7/2007 | Sasakura et al. .............. 235/380 |
| 2008/0318552 A1 | 12/2008 | Harms et al. |

* cited by examiner

*Primary Examiner* — Thanhnga B Truong
(74) *Attorney, Agent, or Firm* — Hitt Gaines, PC.

(57) ABSTRACT

An authentication loading control feature enables a service provider to control the number of authentication procedures or percentage of time that authentication procedures are performed by a network element adapted to perform authentication procedures (e.g., a Serving GPRS Support Node (SGSN) of a UMTS network); and an information recapture feature enables the network element to obtain, in the absence of authentication, UE information that conventionally would have been received as a part of the authentication procedure as needed, for example and without limitation, to support charging and lawful intercept functions.

13 Claims, 2 Drawing Sheets

AUTHENTICATION LOADING CONTROL AND INFORMATION RECAPTURE IN A UMTS NETWORK

CROSS-REFERENCE TO RELATED APPLICATIONS

This Application is a continuation of prior application Ser. No. 11/820,341, filed on Jun. 19, 2007 now U.S. Pat. No. 8,175,270 and currently pending, to David C. Harms, et al. The above-listed Application is commonly assigned with the present invention and is incorporated herein by reference in its entirety.

FIELD OF THE INVENTION

The invention is related to the field of communications and, in particular, to authentication loading control and information recapture in UMTS networks.

STATEMENT OF THE PROBLEM

Universal Mobile Telecommunications System, or UMTS, is a third-generation (3G) wireless communication technology that offers broadband, packet-based multimedia and data services to users having suitably equipped user equipment (UE) comprising, for example, cell phones, mobile computers or the like. For a UMTS call, an originating or terminating UE wirelessly communicates, via RF resources, with a radio access network known as a UTRAN (UMTS Terrestrial Radio Access Network). A UMTS core network connects the UTRAN to an external packet network (e.g., the Internet). The UMTS core network provides mobility management, session management and transport for Internet Protocol packet services including, for example, high speed data, music and video downloads and live TV. The UMTS core network also provides support for additional functions, including, without limitation, authentication, charging and lawful interception (a.k.a., wiretapping).

A Serving GPRS (General Packet Radio Services) Support Node (SGSN) is the element of the UMTS core network that is responsible for authentication, session management, packet routing and mobility management. The SGSN also supports charging and lawful intercept functions in concert with respective charging and lawful intercept gateway elements of the core network. Conventionally, the SGSN performs an authentication procedure whenever a UE attaches to the network, to confirm that the UE is a valid user of the network services requested. As a part of the authentication procedure, the SGSN obtains an International Mobile Equipment Identity (IMEI) number uniquely associated with the UE. Alternatively or additionally, the SGSN may obtain an IMEI-SV, an encrypted form of IMEI from which IMEI can be derived. In either case, the IMEI is used to identify the UE for purposes of authentication, charging and lawful intercept functions.

A problem that arises, most particularly during periods of high demand on network resources, is that the service provider may desire a more flexible arrangement for performing authentication procedures. For example, the service provider may wish to perform authentication procedures less frequently in high volume situations to reduce SGSN loading and enhance system performance. However, if authentication is performed less frequently, there will be instances when the IMEI is not obtained for one or more UEs coincident to authentication, yet the SGSN relies on the IMEI to support functions including, without limitation, charging and lawful intercept functions.

SUMMARY OF THE SOLUTION

This invention solves the above and other problems by providing an authentication loading control feature through which a service provider can control the percentage of time that authentication procedures are performed by the SGSN; and an information recapture feature for obtaining, in the absence of authentication, UE information that conventionally would have been received as a part of the authentication procedure. Advantageously, the authentication loading control feature will permit less frequent authentication procedures in high volume situations; and the information recapture feature will enable the SGSN to obtain the IMEI associated with UE for which authentication was not performed to support functions including, without limitation, charging and lawful intercept functions.

In one embodiment, there is provided a method for use in a communication network including a network element (e.g., SGSN) operable to perform authentication procedures for a plurality of user equipment (UE). One or more authentication control thresholds are provisioned defining network loading criteria for invoking different levels of authentication procedures. Network loading conditions are monitored relative to the authentication control thresholds, and different levels of authentication procedures are invoked based on changes in network loading conditions relative to the authentication control thresholds.

In another embodiment, there is provided a method for use in a UMTS network including a Serving GPRS Support Node (SGSN) operable to perform authentication of a plurality of user equipment (UE), wherein the SGSN nominally obtains identification parameters (e.g., IMEI number) associated with the UE coincident to authentication. When it is determined that the IMEI is needed for a designated UE but for which authentication was not performed, for example and without limitation, to support charging or lawful intercept functions, the SGSN obtains the IMEI associated with the designated UE independent of authentication.

DESCRIPTION OF THE DRAWINGS

The same reference number represents the same element or the same type of element on all drawings.

DETAILED DESCRIPTION OF THE INVENTION

Figure 1:
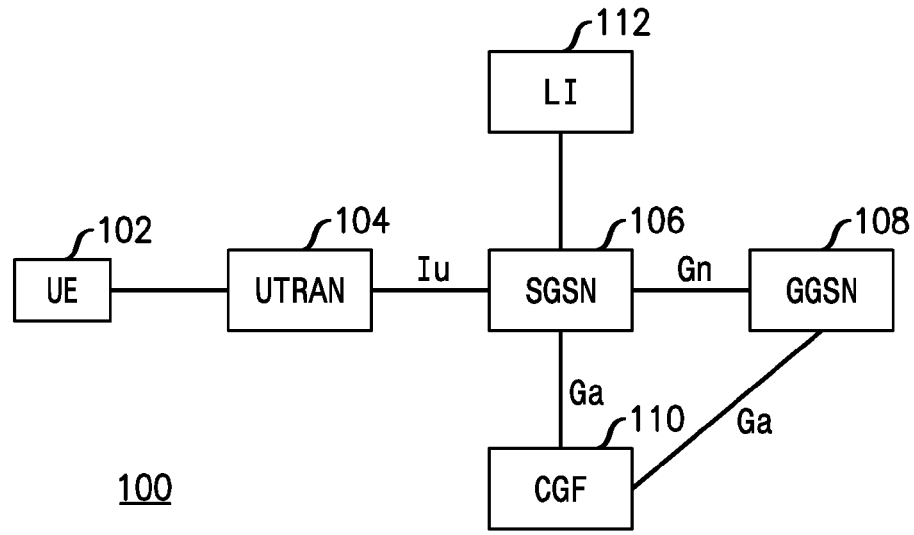
FIG. 1 illustrates a UMTS network in an exemplary embodiment of the invention operable to provide authentication loading control and information recapture features.
Figure 2:
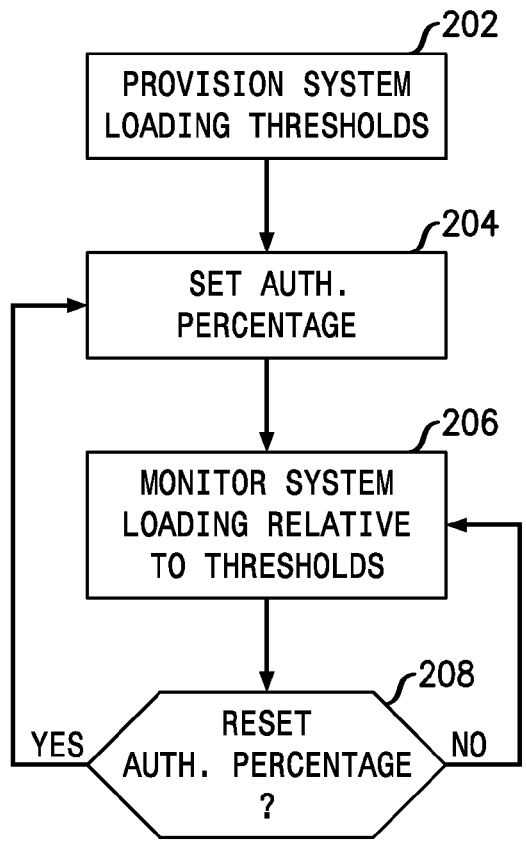
FIG. 2 is a flow chart illustrating a method of operating a UMTS network to provide an authentication loading control feature in an exemplary embodiment of the invention
Figure 3:
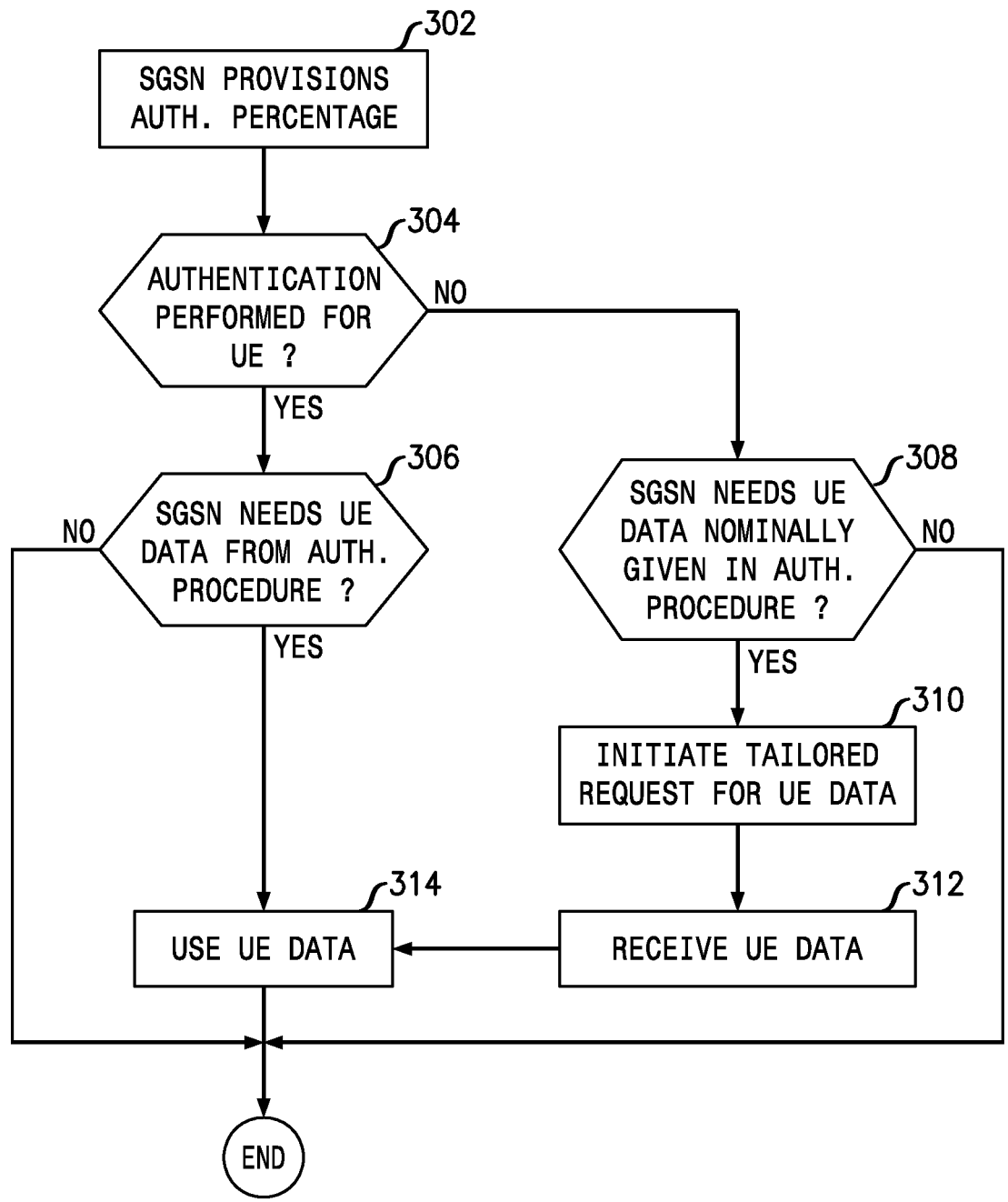
FIG. 3 is a flow chart illustrating a method of operating a UMTS network to provide an information recapture feature in an exemplary embodiment of the invention.

FIGS. 1-3 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

FIG. 1 illustrates a UMTS network 100 in an exemplary embodiment of the invention. A plurality of UEs 102 (one shown) wirelessly communicate, via RF resources, with a radio access network (UTRAN) 104 residing, for example, at serving base sites. The UTRAN 104 communicates via Iu interface with a UMTS core network comprising a Serving GPRS Support Node (SGSN) 106, Gateway GPRS Support Node (GGSN) 108, charging gateway function (CGF) 110 and lawful intercept (LI) gateway 112. As will be appreciated, the SGSN 106, GGSN 108, CGF 110 and LI gateway 112 are functional elements that may reside individually or collectively within a single device or multiple devices. The UMTS network 100 may include other networks, systems, or devices not shown in FIG. 1.

The SGSN 106 performs mobility management, authentication and authorization, session management, packet routing and relay, admission control, packet encapsulation and tunneling for the UMTS network 100. The SGSN 106 also supports charging and lawful intercept functions in combination with the CGF and LI gateways 110, 112. According to features and aspects herein, the SGSN is operable to control the number or percentage of time that authentication procedures are performed, for example, to perform authentication less frequently during disaster recovery or other high volume situations. Further, the SGSN is operable in the absence of authentication to obtain user data such as IMEI that conventionally would have been received as a part of the authentication procedure; and, with use of the IMEI, to assist the CGF and LI gateways with charging and lawful intercept functions.

The GGSN 108 provides an interface between the SGSN 106 and external packet data networks (not shown) comprising, for example, the Internet or private data network. The connection between the SGSN 106 and GGSN 108 is called the Gn interface. The SGSN 106 and GGSN 108 communicate via the Gn interface using GPRS Tunneling Protocol (GTP). The GGSN 108 converts packets received from the SGSN from GPRS format to into a format appropriate to the external data network (e.g., Internet Protocol or X.2S) and vice versa.

The CGF 110 comprises, for example and without limitation, a Charging Gateway Function as defined by the 3GPP Release 6. The CGF is an element, system, or server adapted to receive charging records from the SGSN 106 and GGSN 108, store and forward the records to a centralized charging system. The connection from the SGSN 106 and GGSN 108 to the CGF 110 is called the Ga interface. In one embodiment, the charging records provided to the CGF by the SGSN 106 include user data (e.g., IMEI) to identify the users associated with the charging records. According to features and aspects herein, the SGSN is operable to obtain the user data (e.g., IMEI) and include it in the charging records even if it is not received as a part of an authentication procedure.

The LI gateway 112 is an element, system, or server adapted to lawfully intercept certain calls, after following due process and receiving proper authorization (e.g., a warrant) from competent authorities. In one embodiment, the LI gateway initiates a lawful intercept request by sending a message to the SGSN 106 with user data (e.g., IMEI) to identify the user that is to be monitored. Responsive to the request, the SGSN 106 delivers content associated with the IMEI to the LI gateway. According to features and aspects herein, the SGSN is operable to obtain the IMEI even if it is not received as a part of an authentication procedure, so as to identify the user and corresponding content associated with the IMEI and deliver the requested content to the LI gateway 112.

FIG. 2 shows a method of operating a UMTS network to provide an authentication loading control feature according to an exemplary embodiment of the invention. The steps of FIG. 2 will be described with reference to UMTS network 100 in FIG. 1. In one embodiment, the steps of FIG. 2 are implemented in software or firmware residing in the SGSN 106 shown in FIG. 1. The steps of the flow chart in FIG. 2 are not all inclusive and may include other steps not shown.

At step 202, the service provider or equipment vendor associated with the SGSN 106 configures system loading thresholds for performing specified actions, generating reports or the like when the thresholds are reached. In one embodiment, one or more of the thresholds comprise authentication control thresholds that trigger the SGSN to adjust the number or percentage of time that authentication procedures are performed by the SGSN. The authentication control thresholds may be based on parameters including, for example and without limitation, the volume/rate of users attaching to the UMTS core network, CPU usage (e.g., percentage of CPU capacity) or the like. As one example, the service provider or equipment vendor could provision graduated authentication thresholds based on CPU usage and corresponding authentication percentages as follows:

0-50% CPU usage—100% authentication
50-75% CPU usage—75% authentication
75-90% CPU usage—25% authentication
90-100% CPU usage—5% authentication Optionally, the authentication control thresholds can be dynamically adjusted based on network characteristics or conditions, user or user equipment characteristics, external conditions or the like. For example and without limitation, the authentication control thresholds may be varied or adjusted based on different services supported by the UMTS network, different functions or configurations of the GPRS core network, external network type, geographic location, time of day, day of week or holidays.

At step 204, the SGSN 106 sets or determines an authentication percentage. In one embodiment, the authentication percentage is conditioned on the system loading conditions and thresholds provisioned at step 202, for example, 100% authentication for 50-75% CPU usage, etc. Optionally, the authentication percentage may define a pre-provisioned value independent of system loading conditions (e.g., 100% authentication upon initialization of SGSN 106).

At step 206, the SGSN 106 monitors system loading parameters relative to the authentication control thresholds configured at step 202. At step 208, the SGSN 106 determines, responsive to monitoring system loading parameters relative to the authentication control thresholds at step 206, whether it needs to reset or readjust the authentication percentage. In response to a positive determination at step 206 (i.e., readjustment is needed), the process returns to step 204 to set a new authentication percentage. In response to a negative determination at step 206 (i.e., readjustment is not needed), the process returns to step 206 to continue monitoring system loading parameters.

In one embodiment, the SGSN will readjust to a less frequent authentication percentage if system loading has increased to a next higher threshold since the authentication percentage was last set at step 204. Conversely, the SGSN will readjust to a more frequent authentication percentage if system loading has reduced to a next lower threshold since the authentication percentage was last set at step 204. The SGSN does not readjust the authentication percentage at step 208 if system loading has not increased to a next higher threshold or decreased to a next lower threshold since the authentication percentage was last set at step 204.

In one example, with reference to the exemplary authentication thresholds described in relation to step 202 and without limitation, the SGSN will readjust from 100% authentication to 75% authentication if the CPU usage advances from below 50% to the 50-75% threshold. Thereafter, the SGSN will remain at 75% authentication for so long as CPU usage remains at 50-75%. However, the SGSN will readjust from 75% authentication to 25% authentication if CPU usage increases beyond the 50-75% threshold (i.e., to within the 75-90% threshold) or will readjust from 75% authentication to 100% authentication if CPU usage declines below the 50-75% threshold (i.e., to within the 0-50% threshold).

Now turning to FIG. 3, there is shown a method of operating a UMTS network to provide an information recapture feature according to an exemplary embodiment of the invention. The steps of FIG. 3 will be described with reference to UMTS network 100 in FIG. 1. In one embodiment, the steps of FIG. 3 are implemented in software or firmware residing in the SGSN 106, CGF 110 or LI gateway 112 shown in FIG. 1. The steps of the flow chart in FIG. 3 are not all inclusive and may include other steps not shown.

At step 302, the SGSN 106 configures an authentication percentage, for example, in the manner described in relation to FIG. 2 by determining and periodically readjusting an authentication threshold based on system loading parameters (e.g., CPU usage, user volume or the like) relative to one or more authentication thresholds. Advantageously, the SGSN will configure an authentication percentage that is less than 100% in high volume situations to reduce SGSN loading and enhance system performance.

Step 304 is a decision block whereby the SGSN determines whether authentication was performed for a particular UE. If authentication was performed, the process moves to step 306. It is noted, if authentication was performed, the SGSN is presumed to have obtained and stored user data associated with the UE in conventional fashion during the authentication. The user data comprises in one embodiment an International Mobile Equipment Identity (IMEI) number uniquely associated with the UE. If authentication was not performed, the process moves to step 308 with the SGSN not having obtained the IMEI.

Step 306 is a decision block whereby, having performed authentication and obtained user data (e.g., IMEI) associated with a particular UE, the SGSN determines whether it needs to use any of the user data obtained from authentication. For example and without limitation, a positive determination may be reached at step 306 if the SGSN needs to include the IMEI in charging records provided to the CGF 110 or if the SGSN receives a request for lawful intercept corresponding to a particular IMEI from the LI gateway 112. If user data is needed, the SGSN uses the user data at step 314 and then the process ends. Otherwise, if a negative determination is reached at step 306, the process ends without using the user data.

Step 308 is a decision block whereby, having not performed authentication for a particular UE, the SGSN determines whether it needs to use any of the user data (e.g., IMEI) that would nominally have been obtained from authentication. For example and without limitation, a positive determination may be reached at step 308 if the SGSN needs the IMEI associated with a particular UE for which authentication was not performed, to include the IMEI in charging records provided to the CGF 110 or if the SGSN receives a request for lawful intercept corresponding to the IMEI from the LI gateway 112. If a negative determination is reached at step 308, the process ends without using the user data.

If a positive determination is reached at step 308, the SGSN initiates a tailored request for the user data (i.e., independent of authentication) at step 310, receives the user data at step 312 and uses the user data at step 314. In one embodiment, the tailored request comprises an IDENTITY REQUEST message, initiated by the SGSN and directed to the UE for which authentication was not performed, to recapture identification parameters (e.g., IMEI or IMEI-SV) that would nominally have been received during authentication. The SGSN receives the requested identification parameters via an IDENTITY RESPONSE message from the UE.

The IDENTITY REQUEST and IDENTITY RESPONSE messages are described in Section 4.7.8 of 3GPP TS 24.008, Release 6. Heretofore, the IDENTITY REQUEST message is known to be initiated by the network responsive to a failed authentication attempt (i.e., where the network receives unexpected user data during authentication). According to features and aspects herein, the IDENTITY REQUEST message is initiated by the SGSN independent of authentication (or failed authentication), for example, in cases where the authentication percentage is less than 100% due to system loading conditions (see FIG. 2) and the SGSN has not and will not attempt authentication of a particular UE, yet the SGSN recognizes that identification parameters are needed for such purposes as charging or lawful intercept functions or other function. By means of less frequent authentications and judicious use of the IDENTITY REQUEST message, the SGSN is able to reduce network traffic yet maintain sufficient functionality particularly during situations of disaster recovery or other high volume situations.

The present invention may be embodied in other specific forms without departing from its spirit or essential characteristics. The authentication loading control and information recapture features are not limited to UMTS networks but rather may be implemented in any type of communication network. Generally, the authentication loading control feature may be used to control the number or percentage of time that authentication procedures are performed in any type of communication network; and the information recapture feature may be used to obtain, in the absence of authentication, any information that conventionally would have been received as a part of the authentication procedure. The described embodiments are to be considered in all respects only as illustrative and not restrictive. The scope of the invention is, therefore, indicated by the appended claims and any equivalents thereof rather than by the foregoing description.

The invention claimed is:

1. In a communication network including a network element operable to perform authentication procedures for a plurality of user equipment (UE), a method comprising:
provisioning one or more authentication control thresholds defining network loading criteria for invoking different levels of authentication procedures;
monitoring network loading conditions relative to the authentication control thresholds; and
invoking different levels of authentication procedures to be performed by the network element based on changes in network loading conditions relative to the authentication control thresholds.

2. The method of claim 1, wherein the communication network comprises a Universal Mobile Telecommunications System (UMTS) network and the network element operable to perform authentication procedures comprises a Serving GPRS Support Node (SGSN).

3. The method of claim 2, wherein the authentication control thresholds define one or more CPU capacity thresholds associated with the SGSN for invoking different authentication percentages performed by the SGSN.

4. The method of claim 3, wherein the authentication control thresholds include at least one CPU capacity threshold provisioned to invoke an authentication percentage of less than 100%.

5. The method of claim 4, wherein the step of invoking different authentication percentages comprises periodically invoking an authentication percentage of less than 100%, yielding one or more non-authenticated UEs.

6. The method of claim 5, further comprising, responsive to invoking different authentication percentages and yielding one or more non-authenticated UEs:
   determining, by the SGSN, that it needs identification parameters associated with a designated UE of the one or more non-authenticated UEs; and
   obtaining, by the SGSN, the identification parameters associated with the designated UE independent of authentication procedures.

7. The method of claim 6, wherein the identification parameters comprise an International Mobile Equipment Identity (IMEI) number associated with the designated UE.

8. The method of claim 7, wherein the step of obtaining the identification parameters is accomplished by the SGSN:
   sending an IDENTITY REQUEST message to the designated UE;
   receiving an IDENTITY RESPONSE message from the designated UE; and
   retrieving the IMEI from the IDENTITY RESPONSE message.

9. In a UMTS network including a Serving GPRS Support Node (SGSN) operable to perform authentication of a plurality of user equipment (UE), the SGSN nominally obtaining identification parameters associated with the UE coincident to authentication, a method comprising:
   determining that the SGSN requires identification parameters associated with a designated UE for which authentication was not performed; and
   obtaining the identification parameters associated with the designated UE independent of authentication.

10. The method of claim 9, wherein the identification parameters comprise an International Mobile Equipment Identity (IMEI) number associated with the designated UE.

11. The method of claim 10, wherein the step of obtaining the identification parameters is accomplished by the SGSN:
    sending an IDENTITY REQUEST message to the designated UE;
    receiving an IDENTITY RESPONSE message from the designated UE; and
    retrieving the IMEI from the IDENTITY RESPONSE message.

12. The method of claim 10, wherein the SGSN determines that it needs the IMEI associated with the designated UE to support a charging function, the method further comprising:
    generating charging records including the IMEI; and
    providing the charging records to a charging gateway function (CGF).

13. The method of claim 10, wherein the SGSN determines that it needs the IMEI associated with the designated UE to support a lawful intercept function, the method further comprising:
    receiving a lawful intercept request including the IMEI of the designated UE;
    responsive to the request, intercepting content associated with the designated UE and providing the content to a lawful intercept gateway.

* * * * *